J. C. & L. F. SIMPSON.
AUTOMOBILE SIGNAL.
APPLICATION FILED JUNE 10, 1914.
1,248,937.
Patented Dec. 4, 1917.
3 SHEETS—SHEET 1.
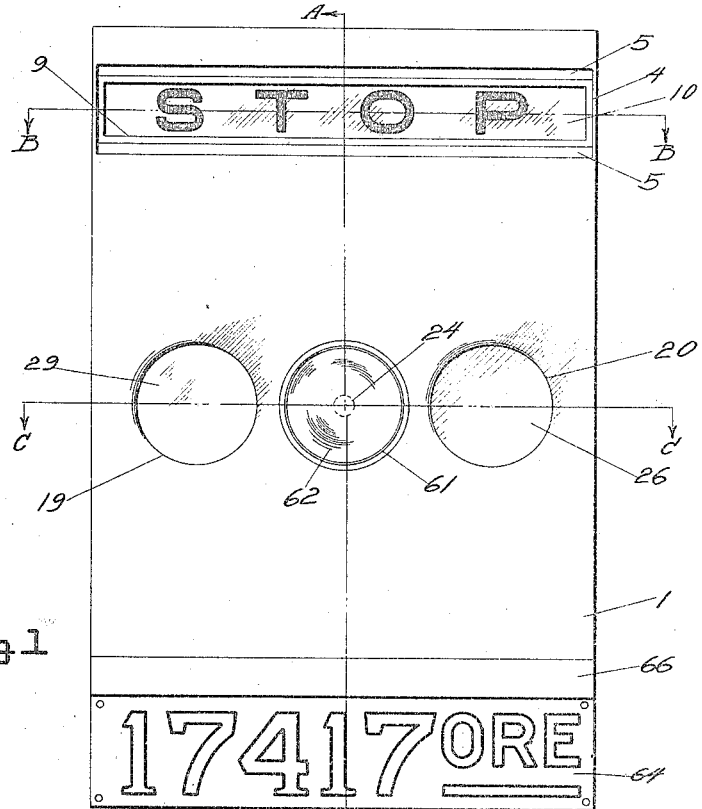
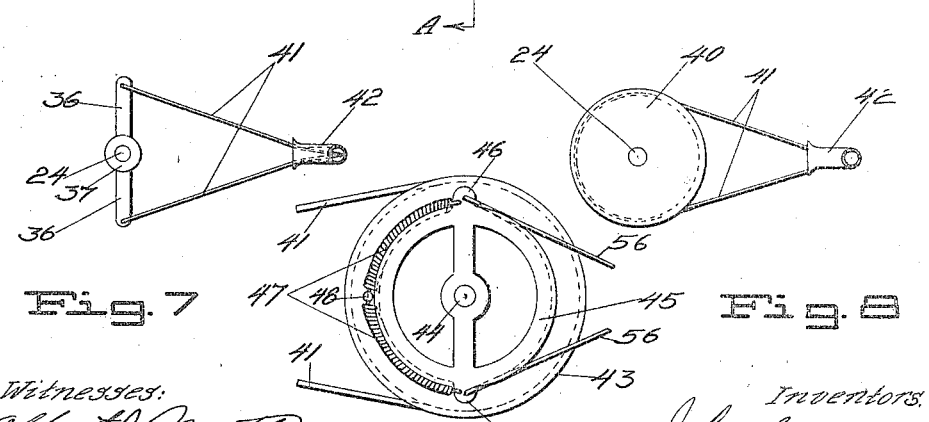
Witnesses:
Albert J Mathot
E Earl Teike
Inventors.
J. C. Simpson
L. F. Simpson
By J. K. Mock
Attorney J. C. & L. F. SIMPSON.
AUTOMOBILE SIGNAL.
APPLICATION FILED JUNE 10, 1914.
1,248,937.
Patented Dec. 4, 1917.
3 SHEETS—SHEET 2.
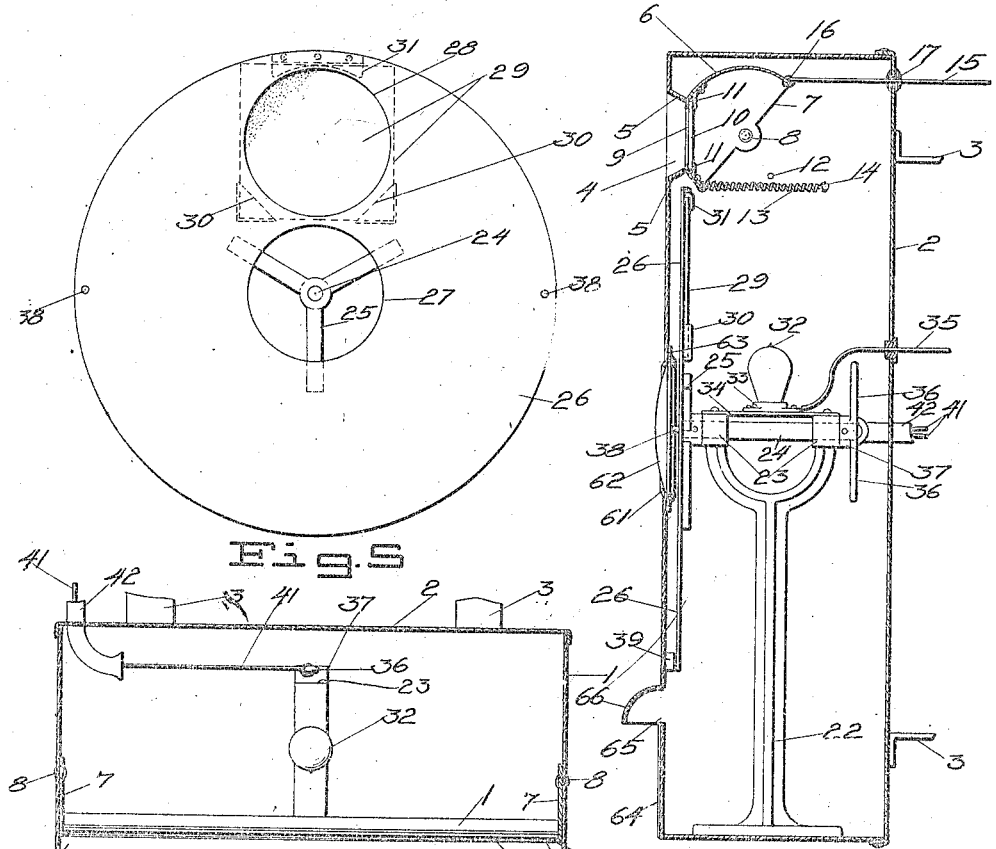
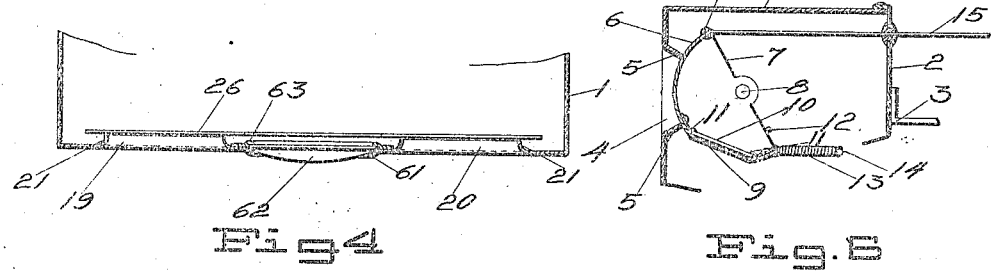

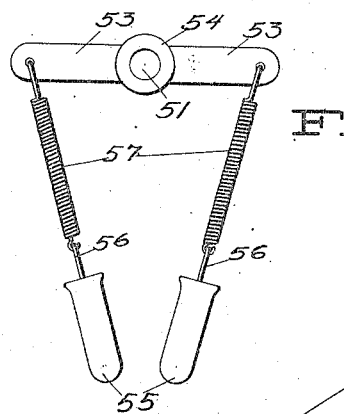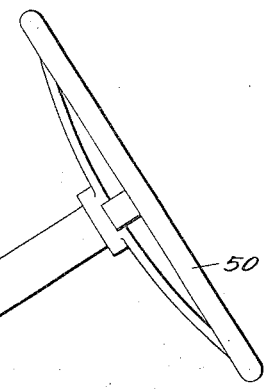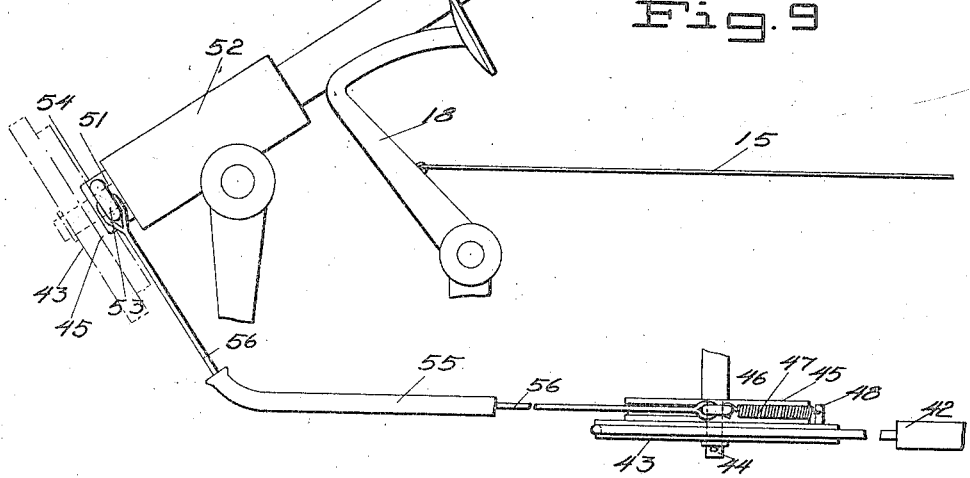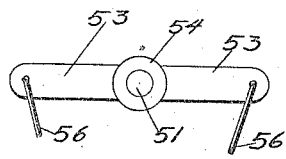

UNITED STATES PATENT OFFICE.

JOHN C. SIMPSON AND LOUIS F. SIMPSON, OF PORTLAND, OREGON, ASSIGNORS, BY DIRECT AND MESNE ASSIGNMENTS, TO PORTLAND SAFETY SIGNAL COMPANY, OF PORTLAND, OREGON.

AUTOMOBILE-SIGNAL.

1,248,937.

Specification of Letters Patent.   Patented Dec. 4, 1917.

Application filed June 10, 1914.   Serial No. 844,170.

*To all whom it may concern:*

Be it known that we, JOHN C. SIMPSON and LOUIS F. SIMPSON, citizens of the United States, residing at Portland, in the county of Multnomah and State of Oregon, have invented certain new and useful Improvements in Automobile-Signals, of which the following is a specification.

This invention relates to improvements in automobile signals and indicators and has for its object to provide signals adapted to automatically warn automobile drivers of any change being made in the direction of travel of the car ahead to which the device is attached. Another object is to provide signals for warning autoists at the rear of a car of any intention to slow down or stop suddenly.

We attain these objects by means of the improvements illustrated in the accompanying drawings, in which:—

Figure 1 is a front elevation of the signal case in which is displayed a "stop" signal, red tail-light "going-to-left" signal, and license number.

Fig. 2 is a sectional side elevation through the center of the signal-case and mechanism, taken on the line A—A in Fig. 1, with the direction-signal in neutral or straight-ahead position.

Fig. 3 is a sectional top plan view through the center of the "stop" signal mechanism, taken on B—B in Fig. 1.

Fig. 4 shows a sectional top plan view through the direction-signal openings and tail-light lens and is taken on C—C of Fig. 1.

Fig. 5 is a detail front elevation of the revoluble direction-signal disk, showing the method of attaching the frosted-glass indicator.

Fig. 6 is a sectional side elevation of the upper portion of the case and mechanism taken on A—A of Fig. 1 and showing the stop-signal opening closet.

Fig. 7 is a detail rear elevation of the turning arms shown in Fig. 2 for turning the direction-signal disk.

Fig. 8 shows a modification of the turning arms shown in Fig. 7 and comprises a sheave adapted to the same purpose.

Fig. 9 is a side elevation of an automobile steering-gear and foot-brake lever with cables attached for operating the "stop" and "direction" signals.

Fig. 10 is a detail end elevation of the steering post with operating arms attached.

Fig. 11 shows a view similar to that shown in Fig. 10, but modified by the addition of compensating springs.

Fig. 12 shows another modification of operating means comprising a sprocket-wheel and chain to take the place of the arms and cables shown in the two last previous views.

Fig. 13 is a plan view of the compensating disks shown in Fig. 9, and used to secure quick actuation of the signals upon slight rotation of the steering wheel while allowing at the same time, proper compensation for the increased tension upon the cables after the signal is set.

Referring to the drawings, 1 indicates a rectangular box-shaped case provided with a cover 2 which may be attached as by screws and in turn may be provided with any suitable form of brackets 3 for attachment to the rear end of an automobile.

Near the top of the case and extending horizontally across the front thereof, is provided an opening 4, the upper and lower edge of the case adjoining the opening being bent in, as at 5, to give strength to the edge. 6 indicates a semi-cylindrical indicator carrier having end members 7 rigidly attached to and pivotally mounted in the case at 8 and so disposed as to extend axially across the case the full width of the opening 4 and central therewith. An opening is provided in said indicator carrier at 9, and is covered by an indicator glass 10 upon which the word "Stop" or any other suitable warning is painted. The glass 10 is held in place by strips 11 which may be attached as by screws. It is obvious that by rotation of the indicator carrier, the opening 4 may be closed or may be covered by the glass 10 with its warning as described.

At 12 is provided a limit pin which is attached to the side wall of the case so as to be engageable by the side members 7 of the indicator carrier for the purpose of limiting its downward movement. A spring 13 is carried by the case at 14 and attached to the indicator 6, so as to hold it normally against the limit pin 12 in non-indicating position. In order to revolve the indicator carrier into signaling position, a small wire cable 15 is attached to the upper edge of the carrier at 16 and passes out of the case through a guide bushing or gromet 17 to the forward end of the automobile where it is preferably attached to the foot-brake lever 18 as shown in Fig. 9, this view being reversed for convenience of arrangement. It is evident now that any forward movement of the foot brake lever for the purpose of applying the brakes to stop the car, will automatically operate the "stop" signal indicator to warn anyone at the rear of the car. In referring to the signal-case and its mechanism, the part carrying the indicator display opening is termed the front, while reference to the front in regard to the steering gear and brake lever refers to the front of the car.

Two direction-indicating openings in case 1 are provided at 19 and 20 with annular bent-in flanges 21. Within the case a bearing bracket 22 is so disposed and attached as to hold its bearings 23 centrally between and with their axes in the same horizontal plane with the axes of openings 19 and 20. A center shaft 24 is revolubly mounted in the bearings 23 and carries a spider 25 upon which a disk 26 is rigidly mounted and adapted to rotate with the shaft 24. The disk 26 is provided with a center opening 27, and an indicator opening 28. A white, frosted glass 29 is held over the opening 28 by two corner clips 30 and a top clip 31, which are attached to the disk 26 by means of solder or screws as desired.

An electric-light globe 32 is carried by a receptacle 33 supported by a cross bar 34 attached to and above the bearings 23. Insulated wires 35 connect the lamp with the electric-current supply source in the usual manner, passing through a bushing in the cover of the case as shown in Fig. 2.

Rotation of the disk 26 is secured through the medium of a pair of turning arms 36 extending radially and in opposite directions from a hub 37 which is rigidly mounted upon shaft 24. The disk is limited in its rotary movement by means of two limit pins 38 attached to the front of the disk and adapted to engage a stop-lug 39 attached to the inside of the front of case 1. The pins and lug are so disposed as to stop the disk 26 when its opening 28 is in coaxial alinement with opening 19 when turned to the left or with opening 20 when turned to the right.

The front of the case 1 is preferably painted black as well as the front of disk 26, thus presenting a dark and practically unnoticeable surface to view except when the white ground glass 29 appears before one or the other of the said openings 19 or 20. Referring again to the turning arms 36, it will be seen by comparing Figs. 7 and 8 that a sheave, as at 40 in Fig. 8, may be utilized in place of said arms. The turning arms are controlled by the ends of a flexible wire cable 41 which is led toward the front end of the automobile through a guide tube 42 and passes around a sheave 43 pivotally carried by a pin 44, which may be attached to any convenient portion of the car, and is preferably located about midway between the signal case and the lower end of the steering post, as indicated in Fig. 9. Above the sheave 43 and adjacent thereto, a compensating disk 45 is pivotally mounted upon the pin 44 and provided with lugs 46 to which the ends of tension springs 47 are attached, as shown in Fig. 13. The opposite ends of springs 47 are attached to a pin 48 carried by the sheave 43 so that rotary movement of the disk 45 will tend to yieldingly revolve the sheave 43 and consequently rotate the indicating disk 26 until it has reached its limit in the direction in which it is rotated, whereupon the springs 47 will accommodate any further rotation of the disk 45 within the limit of elasticity of the spring in tension. The disk 45 is preferably provided with a peripheral groove 49 for the reception of the springs 47 to prevent them from slipping off when in tension.

In Fig. 9 is shown one of the various forms of automobile steering wheels 50 mounted upon a steering post 51 which is shown extending slightly below its bearing 52.

Operating arms 53 are carried by and are integral with a hub 54, which is mounted rigidly upon the lower extension of the steering post 51 and connected by two flexible wire cables 56 with the lugs 46 of the disk 45, after passing through guide tubes 55. To take up any slack in the cables 56, springs may be interposed between their ends and the operating arms 53 as shown at 57 in Fig. 11. Various modifications might be introduced in the structure just described, as for instance, if desired, the sprocket wheel 59 with sprocket chain 60 could be used in place of the arms 53, or, again, the compensating disk 45 could be rigidly mounted directly upon the lower end of the steering post 51, as indicated by construction lines in Fig. 9, the sheave 43 being pivotally mounted in the same relation to said compensating disk as previously described.

It is obvious now that by making the sheave 43 the proper diameter, a slight rotary movement of the steering post will tend to operate the indicating disk quickly, the compensating mechanism permitting the steering post to continue to revolve as far as desired so that the direction signal at the rear of the car will be automatically set as soon as the steering wheel is slightly rotated from neutral or straight-ahead position.

Returning to the description of the signal case, at 61 is shown an opening provided in the front of the case 1 coaxial with the opening 27 in disk 26 and covered by a red lens 62 held in place by a retaining ring 63.

A license number-plate 64 is shown attached to the front of the case 1 along its lower edge and a longitudinal opening through the case 1 is provided at 65. A reflector 66 is attached to the case above the opening 65 to reflect the light from within onto the license number at night.

As arranged and described, the stop-signal direction indicator, license number and red-tail-light may all be illuminated by means of the one lamp at 32, although any desired number of lamps may be supplied where most effective.

The device as will be noted, is adapted to both day and night use and is so connected with the steering mechanism as to display a white spot in the day time and a white light at night at the left of the red-lens when turning to the left and at the right of the lens when turning to the right.

What is claimed is:

1. A signaling device for motor vehicles comprising a casing having a lens opening and two direction-indicating openings at opposite sides thereof, a revoluble member mounted within said casing and adapted to leave uncovered said lens opening and to normally cover said direction-indicating openings, said revoluble member having an indicating opening adapted to be moved as said revoluble member is revolved in said casing to one or the other of said direction-indicating openings, as desired, a light within said casing, and means operated automatically upon the turning of the vehicle for moving said revoluble member to indicate the direction of turning.

2. A signaling device for motor vehicles comprising a casing having a lens opening and two direction-indicating openings at opposite sides thereof, a revoluble member mounted within said casing and adapted to leave uncovered said lens opening and to normally cover said direction-indicating openings, said revoluble member having transparent indicating means adapted to be moved as said revoluble member is revolved in said casing into register with one or the other of said direction-indicating openings, as desired, a light within said casing, and means operated automatically upon the turning of the vehicle to indicate the direction of turning.

3. A direction-indicating device for automobiles and the like comprising a casing adapted to be mounted upon the rear end of said automobile and provided with a lens opening and two direction-indicating openings at opposite sides thereof, a lens in said lens opening, a disk revolubly mounted within said casing coaxially with said lens opening and having an open center in register with said lens opening, whereby to leave the latter normally uncovered, said disk also having a direction-indicating opening adapted to be moved into register with one or the other of the direction-indicating openings in said casing, a lamp within said casing and operating connections from said disk for automatically revolving the same upon the turning of the vehicle to bring its direction-indicating opening into register with one or the other of the direction-indicating openings in said casing.

4. An automobile signaling device comprising a casing having a lens opening with a lens therein, and two direction-indicating openings at opposite sides thereof, a revoluble member mounted within said casing and normally covering said direction-indicating openings, said revoluble member being provided with a direction-indicating opening set in from the edge of said member and of substantially the same shape as the openings in the casing and adapted to be moved into register with one or the other of the direction-indicating openings in said casing, operating connections from said revoluble member for moving said member automatically upon turning the vehicle, and a source of light within said casing, substantially as described.

5. An automobile signaling device comprising a casing having a lens-covered opening therein, and two direction-indicating openings at opposite sides thereof, a stop signal opening in a different horizontal plane from said lens opening, a revoluble member mounted within said casing and normally covering said direction-indicating openings, said revoluble member being provided with a direction-indicating opening adapted to be moved automatically into register with one or the other of the direction-indicating openings in said casing upon the turning of the vehicle, a stop signal member within said casing adapted to be moved into said stop signal opening automatically when the vehicle is stopped, operating connections for said direction and stop signal members, and a source of light within the casing for simultaneously illuminating said members.

6. An automobile signaling device comprising a casing having a lens-covered opening therein, and two direction-indicating openings at opposite sides thereof, a stop signal opening in a different horizontal plane from said lens opening, a revoluble member mounted within said casing and normally covering said direction-indicating openings, said revoluble member being provided with a direction-indicating opening adapted to be moved automatically into register with one of the other of the direction-indicating openings in said casing upon the turning of the vehicle, a stop signal member within said casing, means operated when the brake is applied for automatically moving the stop signal member into said stop signal opening, connections for operating the direction signal member, and a source of light within the casing common to said members.

In testimony whereof, we affix our signatures in presence of two witnesses.

JOHN C. SIMPSON.
LOUIS F. SIMPSON.

Witnesses:
 E. EARL FEIKE,
 ALBERT J. MATTER.